(12) United States Patent
Earleson

(10) Patent No.: US 7,898,194 B2
(45) Date of Patent: Mar. 1, 2011

(54) SYSTEM FOR SUPPRESSING WHEEL ACCELERATION AFTER A SLIP

(75) Inventor: Walter Earle Earleson, Morton, IL (US)

(73) Assignee: Progress Rail Services Corp, Albertville, AL (US)

( * ) Notice: Subject to any disclaimer, the term of this patent is extended or adjusted under 35 U.S.C. 154(b) by 365 days.

(21) Appl. No.: 12/081,351

(22) Filed: Apr. 15, 2008

(65) Prior Publication Data

US 2009/0256514 A1 Oct. 15, 2009

(51) Int. Cl.
*H02P 1/00* (2006.01)
(52) U.S. Cl. .................. 318/139; 318/52; 318/376
(58) Field of Classification Search .......... 318/139, 318/52, 376, 493, 66, 375
See application file for complete search history.

(56) References Cited

U.S. PATENT DOCUMENTS

| | | | |
|---|---|---|---|
| 3,737,745 A | 6/1973 | Chevaugeon et al. | |
| 3,743,900 A | 7/1973 | Johansson | |
| 3,764,867 A | 10/1973 | Smith | |
| 3,790,871 A | 2/1974 | Smith | |
| 3,898,937 A | 8/1975 | Johnson | |
| 3,930,189 A | 12/1975 | Smith | |
| 3,982,164 A | 9/1976 | de Buhr et al. | |
| 3,984,663 A | 10/1976 | de Buhr et al. | |
| 3,997,822 A | 12/1976 | Logston, Jr. et al. | |
| 4,095,147 A | 6/1978 | Mountz | |
| 4,114,555 A * | 9/1978 | O'Brien, Jr. | 440/6 |
| 4,134,048 A | 1/1979 | Schneider | |
| 4,136,303 A | 1/1979 | Almquist et al. | |
| 4,328,427 A | 5/1982 | Bond | |
| 7,064,507 B2 | 6/2006 | Donnelly et al. | |
| 7,126,293 B1 | 10/2006 | Kumar | |
| 2003/0223738 A1 * | 12/2003 | Hughes et al. | 388/800 |
| 2005/0189886 A1 | 9/2005 | Donnelly et al. | |

* cited by examiner

*Primary Examiner* — Karen Masih
(74) *Attorney, Agent, or Firm* — Finnegan, Henderson, Farabow, Garrett & Dunner LLP

(57) ABSTRACT

A power system having a DC electric motor is disclosed. The DC electric motor may include an armature and a field coil electrically connected in series with the armature, the field coil having an input and an output. The power system may also include an additional electrical path. Additionally, the power system may include one or more current-control elements that control one or more aspects of electrical activity in the additional electrical path, which may include, when inductance of the field coil generates a higher voltage at the output than at the input in response to a decrease in electric current through the field coil, allowing electric current to flow from the output, through the additional electrical path, to the input without flowing through the armature.

18 Claims, 5 Drawing Sheets

SYSTEM FOR SUPPRESSING WHEEL ACCELERATION AFTER A SLIP

TECHNICAL FIELD

The present disclosure relates to power systems having electric motors and, more particularly, to power systems having DC electric motors.

BACKGROUND

Many power systems include a DC electric motor for driving a mechanical power load. For example, a mobile machine (such as a locomotive) may have a DC electric propulsion motor for driving a propulsion device (such as a wheel) to propel the mobile machine. A DC electric motor often includes a field coil (a stationary coil) and an armature (a rotating coil mounted on the rotor of the electric motor). When a DC electric motor drives a mechanical power load, if the torque produced by the electric motor becomes greater than the friction resistance torque exerted against the DC electric motor by the mechanical power load, the DC electric motor may accelerate independent of the load.

This may occur, for example, in the case of a DC electric motor driving a wheel of a locomotive if the wheel torque applied to the wheel by the electric motor becomes greater than the adhesion torque resulting from the adhesion of the wheel to the associated rail. In many circumstances, without knowing the precise value of the adhesion torque between the wheel and the rail, the operator of a locomotive may try to maximize acceleration by attempting to increase the wheel torque generated by the DC electric motor to a high percentage of the adhesion torque. In doing so, the operator may sometimes increase the wheel torque beyond the adhesion torque. Additionally, the adhesion torque between the wheel and the rail may abruptly decrease at some points on the rail for various reasons, which may also cause the wheel torque to exceed the adhesion torque., When the wheel torque exceeds the adhesion torque, the wheel may begin to slip on the rail, and the resulting change from a static coefficient of friction to a dynamic coefficient of friction may significantly reduce the adhesion torque, causing the wheel to accelerate. The more rapidly the wheel accelerates after losing traction, the more time and corrective action it will take to regain adhesion between the wheel and the rail.

When the wheel slips, the rate at which the DC electric motor accelerates depends on the torque generated by the DC electric motor. The more rapidly the torque generated by the motor decreases, the less rapidly the electric motor will accelerate.

The torque generated by a DC electric motor depends in part on the net voltage across the DC electric motor, which equals the difference between the external voltage supplied to the DC electric motor and the magnitude of the opposing "back EMF" generated internally by the DC electric motor. If the external voltage remains constant, increasing the back EMF decreases the net voltage across the DC electric motor, thereby decreasing the current through the armature, which decreases the torque generated by the DC electric motor. The back EMF generated by a DC electric motor equals the product of the electric current in the field coil, the speed of the DC electric motor, and a constant. The positive correlation between the speed of the DC electric motor and the back EMF creates a tendency for the back EMF to increase with increasing speed.

However, the configuration of a typical "series" DC electric motor produces an effect that partially offsets the positive correlation between the back EMF and speed. A typical series DC electric motor has its field coil and armature electrically connected in series, resulting in the field coil always carrying the same magnitude of electric current as the armature. Because of this, any increase in the back EMF would cause a decrease in the electric current in both the armature and the field coil, which would have the effect of decreasing the back EMF. With the current in the field coil forced to decrease at the same rate as the current in the armature and thereby largely offsetting the effect of the increased speed on the back EMF, the back EMF generated by a typical series DC electric motor increases somewhat gradually with increasing speed. Accordingly, when the mechanical load on a typical series DC electric motor decreases abruptly, the motor may accelerate to a very high speed relatively quickly.

U.S. Pat. No. 3,930,189 to Smith ("the '189 patent") discloses a system for suppressing the torque produced by a series DC electric traction motor when a wheel connected to the motor slips. The system of the '189 patent includes an alternator, a plurality of current transformers having primary windings connected to the alternator, and a main power rectifier connected to the primary windings of the current transformers. The armature and field coil of the DC electric traction motor are connected between the terminals of the main power rectifier. If the wheel connected to the DC electric traction motor slips and the electric current flowing through the armature and the field coil begins to drop, the secondary windings of one of the current transformers supplies auxiliary current through the field coil separate from the armature.

Although the '189 patent discloses a system for generating greater electric current in the field coil of a series DC electric motor than in its armature, certain disadvantages persist. For example, the '189 patent does not disclose any way of generating greater electric current in the field coil than in the armature other than by supplying electricity to the field coil with an external power source.

The power system and methods of the present disclosure solve one or more of the problems set forth above.

SUMMARY OF THE INVENTION

One disclosed embodiment relates to a power system. The power system may include a DC electric motor, which may include an armature and a field coil electrically connected in series with the armature, the field coil having an input and an output. The power-system may also include an additional electrical path. Additionally, the power system may include one or more current-control elements that control one or more aspects of electrical activity in the additional electrical path, which may include, when inductance of the field coil generates a higher voltage at the output than at the input in response to a decrease in electric current through the field coil, allowing electric current to flow from the output, through the additional electrical path, to the input without flowing through the armature.

Another embodiment relates to a method of operating a power system. The method may include electrically connecting a field coil and an armature of a DC electric motor in series to a power source. The method may also include, when inductance of the field coil generates a higher voltage at an output of the field coil than at an input of the field coil in response to a decrease in electric current through the field coil, using the induced voltage to drive electric current to flow from the output, through an additional electrical path, to the input without flowing through the armature.

A further embodiment relates to a method of operating a power system. The method may include supplying DC electric current with a power source. The method may also include propelling the mobile machine, which may include electrically connecting the armature and the field coil to the power source in series. The method may also include, in response to a voltage at an output of the field coil being greater than a voltage at an input of the field coil, allowing electric current to flow from the output of the field coil, through a rectifier, to the input of the field coil.

DETAILED DESCRIPTION

Figure 1:
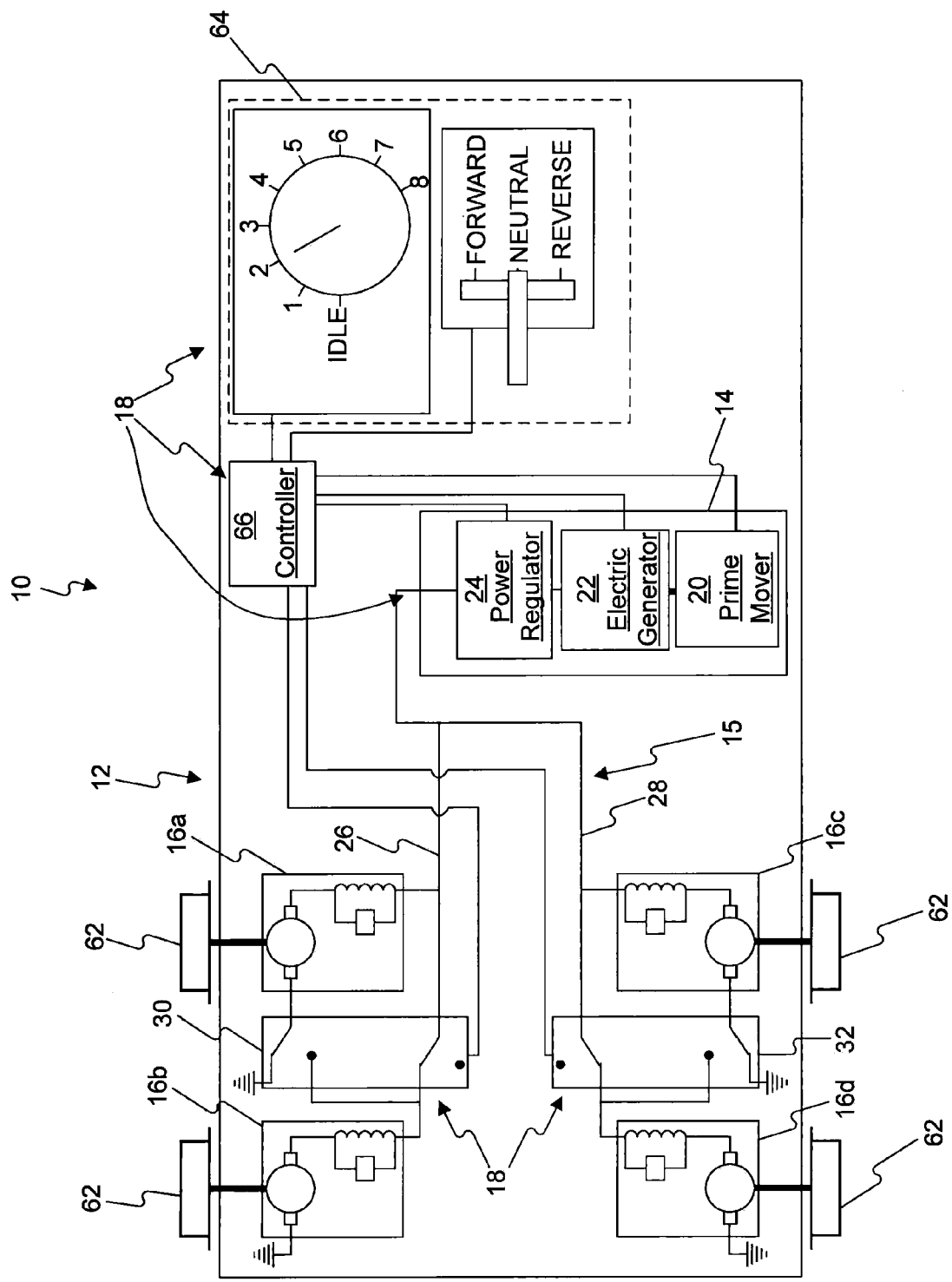
FIG. 1 is a schematic illustration of one embodiment of a machine that includes a power system according to the present disclosure.
Figure 2A:
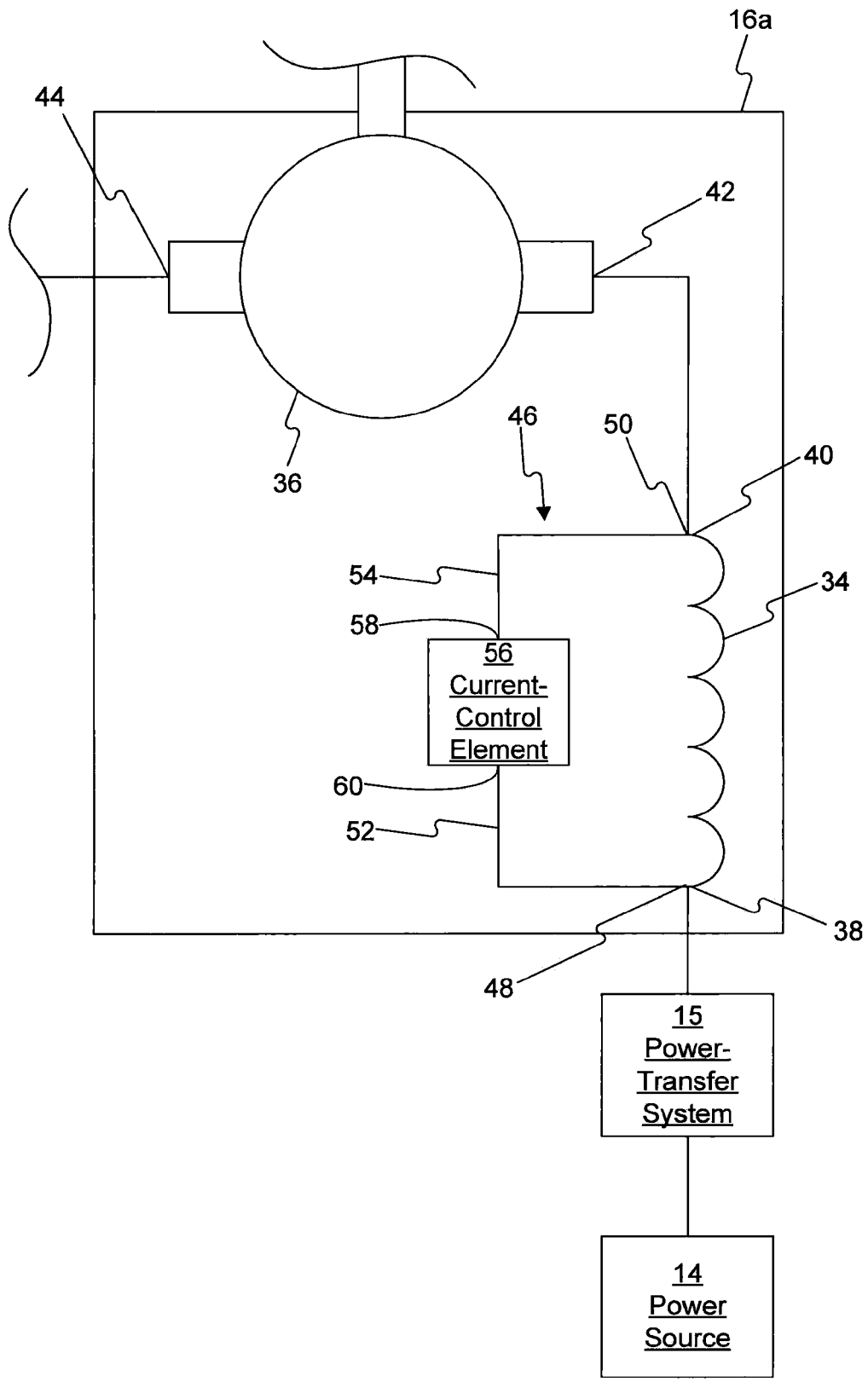
FIG. 2A shows one of the electric motors of the power system in FIG. 1 in greater detail.
Figure 2B:
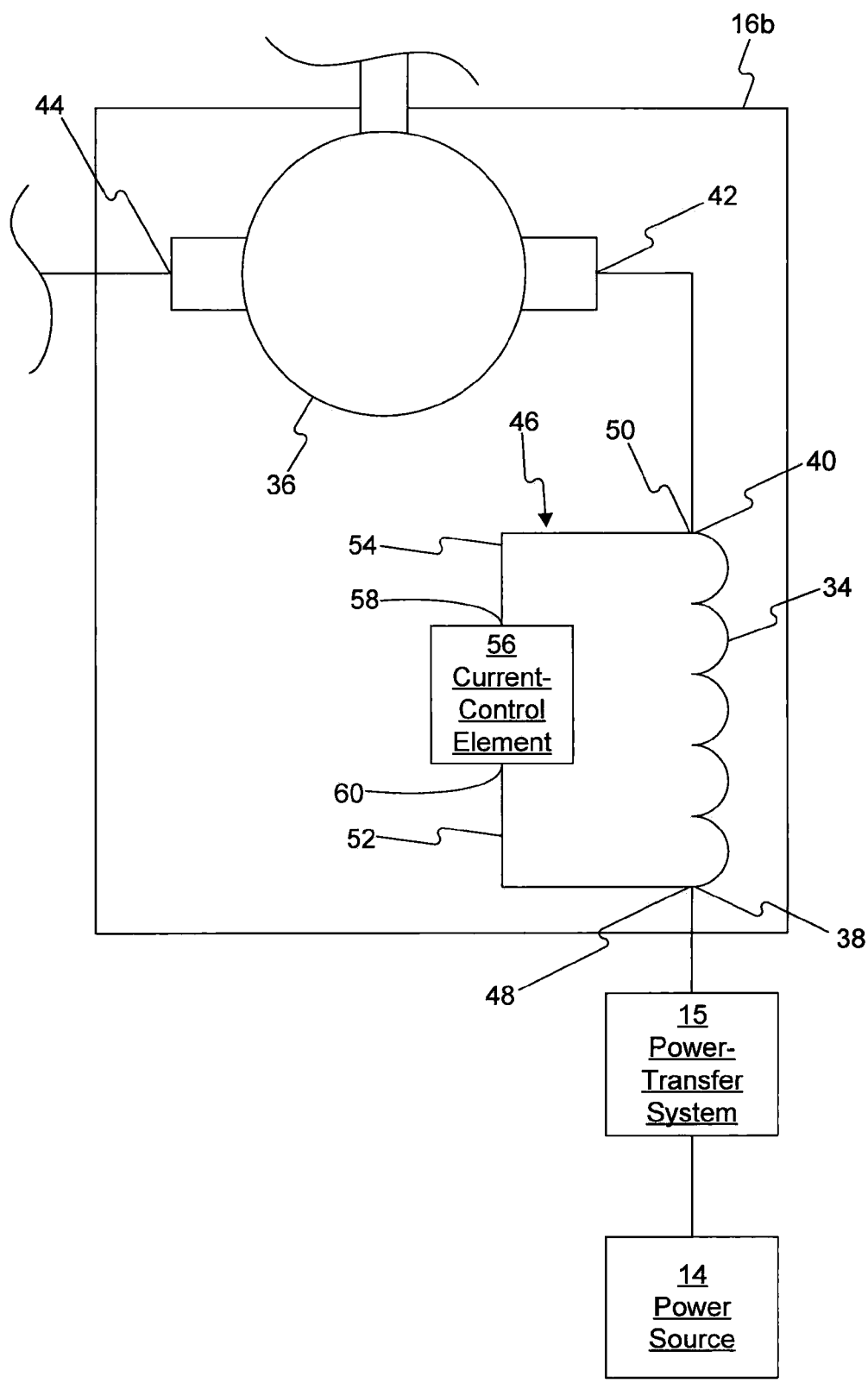
FIG. 2B shows another of the electric motors of the power system in FIG. 1 in greater detail.
Figure 2C:
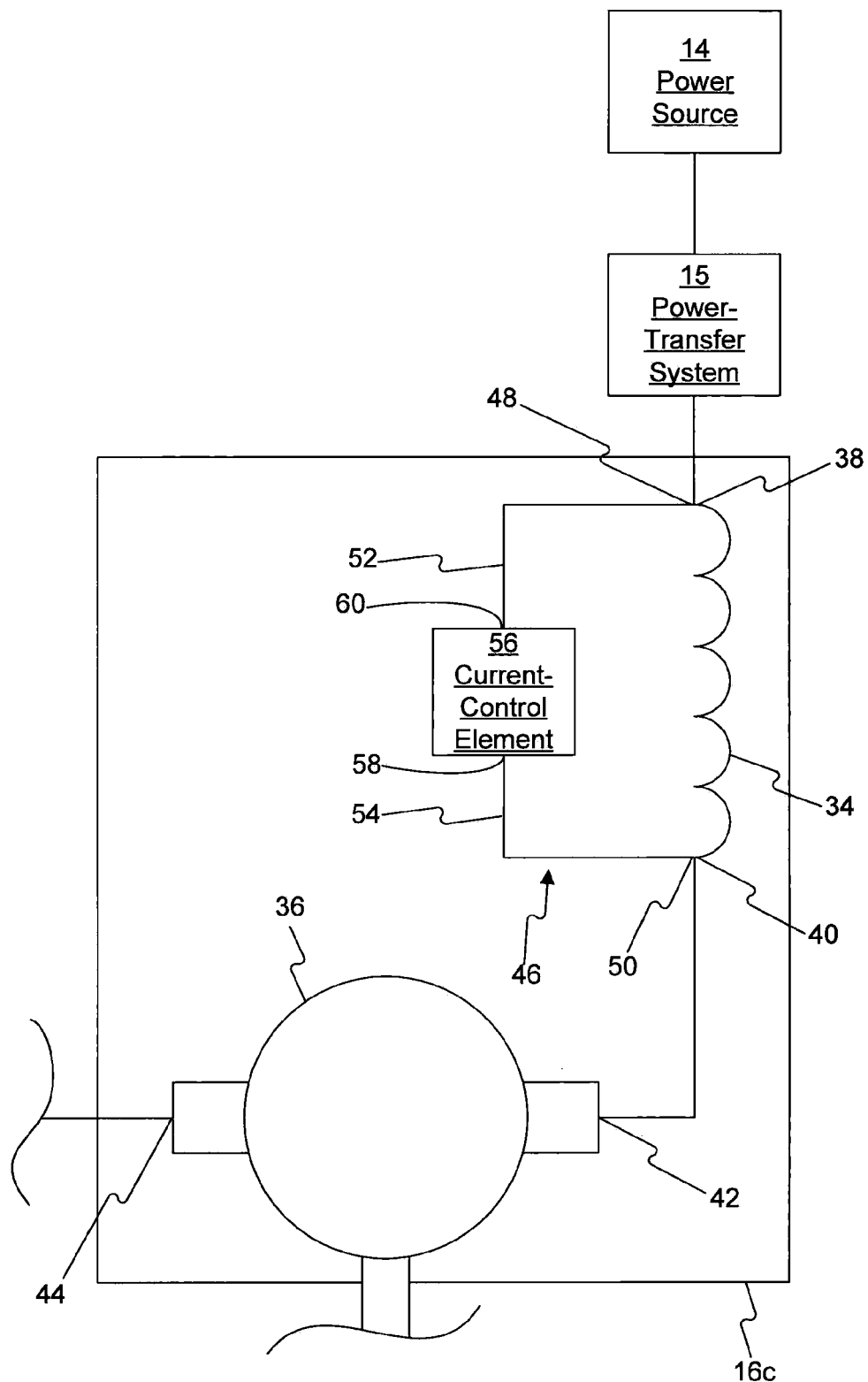
FIG. 2C shows another of the electric motors of the power system in FIG. 1 in greater detail.
Figure 2D:
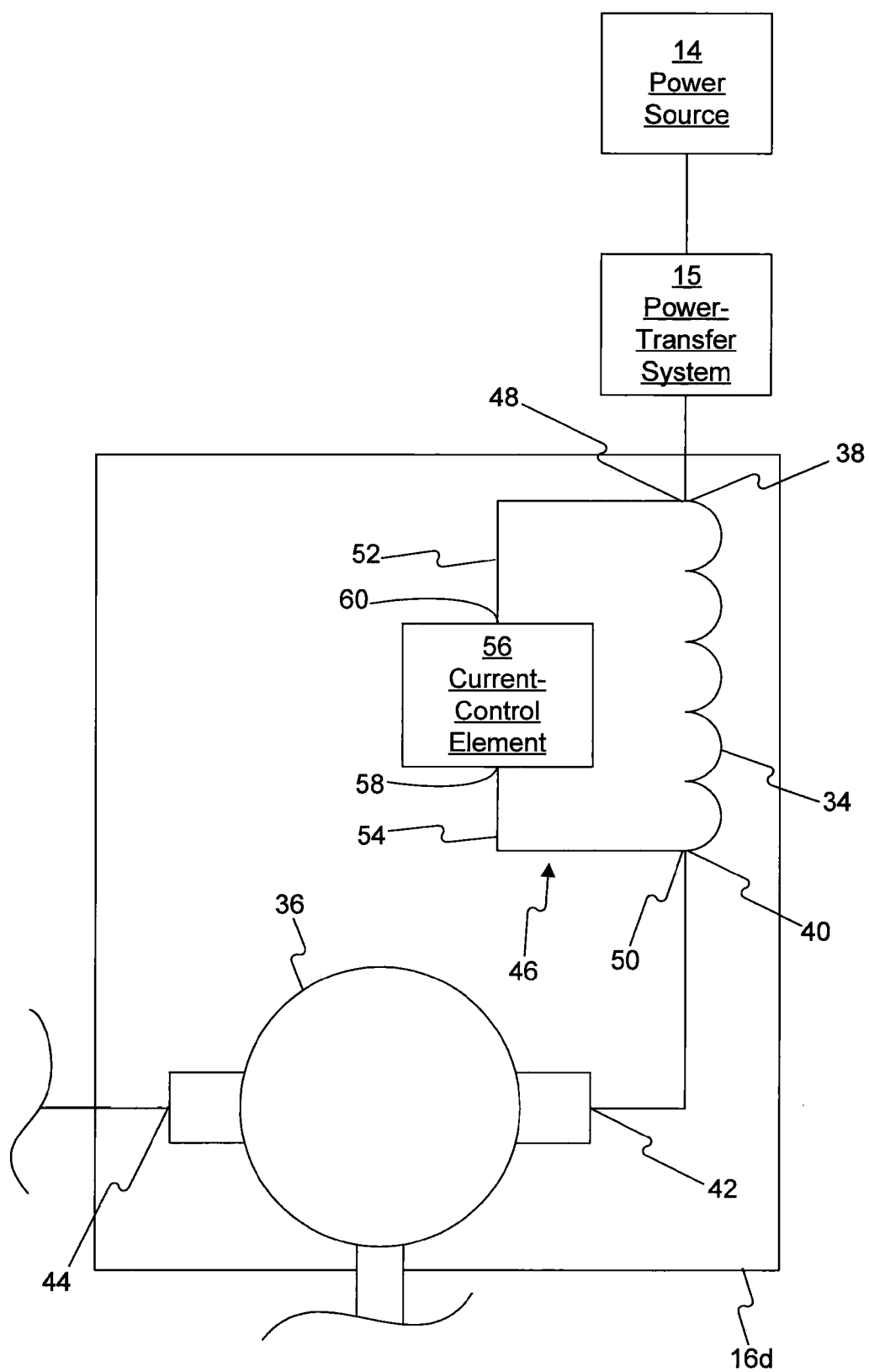
FIG. 2D shows another of the electric motors of the power system in FIG. 1 in greater detail.

FIG. 1 illustrates a machine 10 having a power system 12 according to the present disclosure. Power system 12 may include a power source 14; a power-transfer system 15; electric motors 16a, 16b, 16c, 16d; and power-system controls 18.

Power source 14 may include any component or components operable to supply power for use by one or more other components of machine 10. In some embodiments, power source 14 may include one or more components operable to supply DC electric current for electric motors 16a-16d. For example, power source 14 may include a prime mover 20 drivingly connected to an electric generator 22. Prime mover 20 may be any type of component operable to supply mechanical power, including, but not limited to, a diesel engine, a gasoline engine, a gaseous-fuel driven engine, and a turbine engine. Electric generator 22 may be any type of component operable to receive mechanical power from prime mover 20 and convert at least a portion of that power into electricity, including, but not limited to, an AC induction generator, a permanent-magnet generator, an AC synchronous generator, or a switched reluctance generator. In embodiments where electric generator 22 is configured to generate AC electric current, power source 14 may include rectification and/or a power regulator 24 operable to convert the AC electric current generated by electric generator 22 into DC electric current. Power regulator 24 may also be operable to control the voltage and/or current of the electricity supplied by power source 14.

Power source 14 is not limited to the configuration shown in FIG. 1. For example, in some embodiments, power source 14 may include multiple prime movers and electric generators. Additionally, power source 14 may include other types of components operable to supply electricity, such as fuel cells and/or batteries.

Power-transfer system 15 may include any component or components operable to conduct electricity from power source 14 to electric motors 16a-16d. For example, power-transfer system 15 may include a power line 26 for supplying electricity to electric motors 16a, 16b, as well as a power line 28 for supplying electricity to electric motors 16c, 16d. Power-transfer system 15 may also include various components for controlling whether and/or in what manner electric motors 16a-16d are connected to power lines 26, 28. For example, power-transfer system 15 may include a switching device 30 for controlling whether electric motors 16a, 16b are connected to power line 26 in series or in parallel. Similarly, power-transfer system 15 may include a switching device 32 for controlling whether electric motors 16c, 16d are connected to power line 28 in series or in parallel.

Electric motors 16a-16d may be DC electric motors. FIGS. 2A-2D show electric motors 16a-16d in greater detail. Each of electric motors 16a-16d may include a field coil 34 and an armature 36. The field coil 34 and armature 36 of each electric motor 16a-16d may be electrically connected in series with one another. Power-transfer system 15 may supply electricity from power source 14 to the field coil 34 and armature 36 of any given electric motor 16a-16d by electrically connecting that field coil 34 and armature 36 to power source 14. Each field coil 34 may have an input 38 through which the field coil 34 receives electricity supplied by power source 14 and an output 40 through which electricity supplied by power source 14 exits the field coil 34. Similarly, each armature 36 may have an input 42 through which the armature 36 receives electricity supplied by power source 14 and an output 44 through which electricity supplied by power source 14 exits the armature 36. As FIGS. 2A-2D show, the field coil 34 of each electric motor 16a-16d may connect between power source 14 and the armature 36 of that electric motor 16a-16d. Alternatively, an electric motor 16a-16d may have its armature 36 connected between its field coil 34 and power source 14.

Power system 12 may also include an electrical path 46 connected around the field coil 34 of each electric motor 16a-16d. Each electrical path 46 may have an end 48 connected between the field coil 34 and power source 14, as well as an end 50 connected on a side of the field coil 34 opposite power source 14. For example, end 48 may connect to input 38 of the field coil 34, and end 50 may connect to output 40 of the field coil 34. Each electrical path 46 may include an electrical conductor 52 forming end 48 and an electrical conductor 54 forming end 50 thereof.

Additionally, power system 12 may include one or more current-control elements for controlling one or more aspects of electrical activity in each electrical path 46. For example, each electrical path 46 may include a current-control element 56. In some embodiments, current-control element 56 may be a rectifier having an anode 58 connected to electrical conductor 54 and a cathode 60 connected to electrical conductor 52. Current-control element 56 may be a passive rectifier, such as a diode. Alternatively, current-control element 56 may be an active rectifier, such as, for example, an SCR (sillicon controller rectifier), a GTO (gate turn-off), an IGBT (insulated gate bipolar transistor), or an FET (field-effect transistor). Each current-control element 56 may function (1) to prevent the flow of electricity from the end 48 to the end 50 of the electrical path 46 when the voltage at the end 48 is higher than the voltage at the end 50 and (2) to allow electricity to flow from the end 50 to the end 48 of the electrical path 46 when the voltage at the end 50 is higher than the voltage at the end 48. In embodiments where the current-control element 56 is a diode, current-control element 56 may function in this manner as a result of having its anode 58 connected to end 50 and its cathode 60 connected to end 48. In embodiments where the current-control element 56 is a type of component other than a diode, any appropriate provisions may be implemented to allow current-control element 56 to function in this manner. Such provisions may include, for example, provisions for actively monitoring the voltage at the ends 48, 50 of the electrical path 46 and actively controlling current-control element 56 based on the monitored voltages.

Each electrical path 46 and any current-control elements for controlling electrical activity therein may be included as an integral part of the electric motor 16a-16d they are associated with. Alternatively, one or more parts of an electrical path 46 and/or current-control components for controlling electrical activity therein may be separate components from the associated electric motor 16a-16d.

Returning to FIG. 1, machine 10 may include various types of mechanical power loads connected to electric motors 16a-16d. In some embodiments, machine 10 may be a mobile machine, electric motors 16a-16d may be electric propulsion motors, and machine 10 may include propulsion devices 62 drivingly connected to electric motors 16a-16d. Propulsion devices 62 may include any type of device configured to propel machine 10 by receiving mechanical power produced by electric motors 16a-16d and applying that mechanical power to the environment surrounding machine 10. Such devices may include, but are not limited to, wheels, track units, and propellers. In embodiments where machine 10 is a mobile machine, machine 10 may be any of various different types of mobile machines. In some embodiments, machine 10 may be a railroad locomotive.

Power-system controls 18 may include any components that control power source 14, power-transfer system 15, and electric motors 16a-16d in the manners discussed hereinbelow. In some embodiments, power-system controls 18 may include the current-control element 56 associated with each electric motor 16a-16d, switching devices 30, 32, power regulator 24, an operator interface 64, and a controller 66. Operator interface 64 may include various components operable to transmit operator inputs to one or more other components of power-system controls 18. In embodiments where machine 10 is a mobile machine, operator interface 64 may include various components for transmitting to other components of power-system controls 18 operator inputs relating to the direction and speed at which the operator desires power system 12 to propel machine 10. As FIG. 1 shows, in some embodiments, operator interface 64 may be communicatively linked to controller 66, so that operator interface 64 may transmit operator inputs to controller 66.

Controller 66 may include one or more processors (not shown) and one or more memory devices (not shown). In addition to operator interface 64, various other components and/or systems of machine 10 may provide inputs to controller 66. For example, controller 66 may receive inputs from various sensors (not shown), other controllers (not shown), and/or other types of control components. Controller 66 may also be operatively connected to various components of power system 12 in a manner allowing controller 66 to exercise control over one or more aspects of the operation of those components. For example, controller 66 may be operatively connected to prime mover 20, electric generator 22, power regulator 24, and switching device 30, 32, such that controller 66 may coordinate operation of these components based on inputs from operator interface 64 and/or other sources of information.

Power-system controls 18 are not limited to the configuration shown in FIG. 1. For example, in addition to, or in place, of power regulator 24 and switching devices 30, 32, power-system controls 18 implement various other provisions for controlling the supply of electricity to electric motors 16a-16d. Similarly, in combination with, or in place of controller 66, power-system controls 18 may have various other types of control components, including, but not limited to other controllers, hardwired control circuits, mechanical control systems, hydraulic control systems, and/or pneumatic control systems.

Additionally, machine 10 is not limited to the general configuration shown in FIG. 1. For example, machine 10 may include a different number of electric motors 16a-16d. Similarly, one or more of electric motors 16a-16d may drive mechanical loads other than propulsion devices 62 in order to perform tasks other than propelling machine 10. Indeed, in some embodiments, machine 10 may not be a mobile machine, and each electric motor 16a-16d may serve some role other than propelling machine 10.

INDUSTRIAL APPLICABILITY

Power system 12 may have use for any machine with one or more mechanical power loads that may be driven by electric motors 16a-16d. Power system 12 may perform various tasks by driving one or more mechanical power loads with electric motors 16a-16d.

For example, when operator interface 64 transmits operator inputs indicating that the operator desires propulsion of machine 10, power system 12 may provide such propulsion by supplying DC electric current from power source 14, through power-transfer system 15, to electric motors 16a-16d, thereby driving propulsion devices 62. During such operation, under the direction of controller 66, power-system controls 18 may tailor the torque and power output of electric motors 16a-16d to operator inputs and other operating conditions by controlling various aspects of the operation of power system 12. Power-system controls 18 may, for example, respond to operator requests for increased or decreased tractive effort by increasing or decreasing the voltage at which power source 14 and power-transfer system 15 supply DC electric current to electric motors 16a-16d. Similarly, using switching devices 30, 32, power-system controls 18 may control whether electric motors 16a, 16b are connected in series or in parallel and whether electric motors 16c, 16d are connected in series or in parallel based, for example, on the travel speed of machine 10.

As long as each propulsion device 62 maintains traction, it may exert a relatively steady resistance torque against the electric motor 16a-16d driving it. Under such conditions, within each electric motor 16a-16d, DC electric current from power source 14 may flow in a relatively steady manner into the input 38 of the field coil 34, through the field coil 34, out of the output 40 of the field coil 34, into the input 42 of the armature 36, through the armature 36, and out of the output 44 of the armature 36. As a result, a voltage drop may occur across the field coil 34, such that the voltage at the input 38 of the field coil 34 may exceed the voltage at the output 40 of the field coil 34. With the voltage at the input 38 of the field coil 34 higher than the voltage at the output 40, the flow of electric current through the electrical path 46 may be blocked with the current-control element 56. In some embodiments, this may be accomplished without employing active control measures. For example, in embodiments where the current-control element 56 is a diode with its anode 58 electrically connected to the output 40 of the field coil 34 and its cathode electrically connected to the input 38 of the field coil 34, the current-control element 56 may automatically block the flow of current through the electrical path 46 in response to the input 38 of the field coil 34 having a higher voltage than the output 40. Alternatively, in some embodiments, active control measures may be employed to block the flow of current through the electrical path 46 in response to the input 38 of the field coil 34 having a higher voltage than the output 40. For example, the voltage at the input 38 and the output 40 may be monitored, and the operating state of the current-control element 56 may be controlled to block the flow of current through the electrical path 46 when the voltage at the input 38 is higher than the voltage at the output 40.

In some circumstances one of propulsion devices 62 may lose traction. In embodiments where machine 10 is a locomotive and each propulsion device 62 is a wheel, a propulsion device 62 may lose traction when the wheel torque applied to the propulsion device 62 by the associated electric motor 16a-16d exceeds the adhesion torque between it and the associated rail. This may occur as a result of the operator gradually increasing the wheel torque to try to maximize acceleration and/or due to variations in the adhesion torque between the propulsion device 62 and the associated rail. When one of the propulsion devices 62 loses traction, the resulting change from a static coefficient of friction to a dynamic coefficient of friction between the propulsion device 62 and the rail may cause the resistance torque exerted against the electric motor 16a-16d by the propulsion device 62 to decrease abruptly. As a result, that electric motor 16a-16d may accelerate. This may cause the back EMF generated by the armature 36 to increase, reducing the net voltage across the field coil 34 and the armature 36 and thereby causing the current through the field coil 34 and the armature 36 to drop.

When the electric current in the field coil 34 and the armature 36 begins decreasing, the electrical path 46 may allow the inductance of the field coil 34 to significantly slow the reduction of the electric current flowing through the field coil 34. In response to the decreased current flow in the field coil 34, the inductance of the field coil 34 may drive the voltage at its output 40 higher than the voltage at its input 38. In response to the voltage at the output 40 of the field coil 34 rising above the voltage at the input 38 of the field coil 34, electric current may be allowed to flow from the output 40 of the field coil 34 and the end 50 of the electrical path 46, through the electrical path 46, to the end 48 of the electrical path 46 and the input 38 of the field coil 34. This may allow the inductance of the field coil 34 to significantly suppress reduction in the quantity of electric current flowing through the field coil 34 by driving electric current in a loop through the field coil 34 and the electrical path 46. By driving this electric current through a loop that does not include the armature 36, the current in the field coil 34 may be maintained relatively high while allowing the current in the armature 36 to decrease more rapidly.

Circulating electricity in a loop through the field coil 34 and the electrical path 46 when the load on the electric motor 16a-16d decreases abruptly may tend to reduce the rate of the resulting acceleration of the electric motor 16a-16d. Maintaining the electric current in the field coil 34 high may enhance the rate at which the back EMF increases as the electric motor 16a-16d accelerates. Additionally, by allowing electricity to flow relatively freely from the output 40 to the input 38 of the field coil 34 when the voltage at the output 40 is above the voltage at the input 38, the electrical path 46 may help limit the amount by which the voltage at the output 40 rises. Both of these effects may contribute to more rapid reduction of the current in the armature 36, thereby driving the torque generated by the electric motor 16a-16d down more rapidly. This may slow the acceleration of the electric motor 16a-16d.

Various approaches may be employed to allow electricity to flow from the output 40 of the field coil 34, through the electrical path 46, to the input 38 of the field coil 34 in response to the voltage at the output 40 rising above the voltage at the input 38. In some embodiments, this may be accomplished without active control measures. For example, in embodiments where current-control element 56 is a diode with its anode 58 electrically connected to the output 40 of the field coil 34 and its cathode 60 electrically connected to the input 38 of the field coil 34, current-control element 56 may automatically allow electricity to flow from the output 40, through the electrical path 46, to the input 38 whenever the voltage at the output 40 is higher than the voltage at the input 38. On the other hand, in some embodiments, active control measures may be implemented to allow the flow of electricity from the output 40 of the field coil 34, through the electrical path 46, to the input 38 of the field coil 34 in response to the voltage at the output 40 rising above the voltage at the input 38. For example, the voltage at the input 38 and the output 40 of the field coil 34 may be monitored and the operating state of current-control element 56 may be changed to allow current flow in response to the voltage at the output 40 rising above the voltage at the input 38.

Using the inductance of the field coil 34 to suppress reduction of current in the field coil 34 to generate greater electric current in the field coil than the armature 36 when the electric current in the armature drops as a result of an abrupt decrease in mechanical load may provide certain advantages. For example, this approach represents a simple, cost-effective way of slowing acceleration of the electric motor 16a-16d very quickly after a sudden decrease in the mechanical load on the electric motor 16a-16d.

Of course, allowing the inductance of the field coil 34 to suppress reduction of the electric current in the field coil 34 in the event of a propulsion device 62 losing traction may not, by itself, reduce the output torque of the associated electric motor 16a-16d enough to restore traction. Accordingly, in combination with the disclosed approach for suppressing undesired acceleration of the electric motor 16a-16d, various active control strategies may be used to arrest acceleration of the electric motor 16a-16d and restore traction. For example, one type of active control strategy that may be implemented is a strategy for reducing the electricity output of electric generator 22 (e.g., an EMD "-2" or similar system) when wheel slip is detected. Another example of an active control strategy that may be used in combination with the strategy of using the inductance of the field coil 34 to resist current decay in the field coil 34 is using an external power source to actively inject additional current into the field coil 34 when wheel slip is detected. Of course various other active control strategies for arresting wheel slip may be used in combination with the strategy of allowing the inductance of field coil 34 to resist current decay in the field coil 34. Such active control strategies may take time to respond to and begin counteracting undesired acceleration of an electric motor 16a-16d. The disclosed approach of using the impedance of the field coil 34 to suppress acceleration of the electric motor 16a-16d until such an active control strategy can respond decreases the amount of corrective action that the active control strategy may need to take to restore traction when it does finally respond. This may help reduce the amount of time that the wheel slips and help the operator and the control system to achieve a higher average amount of tractive effort provided. Increasing the time average amount of tractive effort may allow machine 10 to do more work, thereby giving the owner of machine 10 a better return on investment.

It will be apparent to those skilled in the art that various modifications and variations can be made in the power system and methods without departing from the scope of the disclosure. Other embodiments of the disclosed power system and methods will be apparent to those skilled in the art from consideration of the specification and practice of the power system and methods disclosed herein. It is intended that the specification and examples be considered as exemplary only, with a true scope of the disclosure being indicated by the following claims and their equivalents.

What is claimed is:

1. A power system, comprising:
a wheel;
a DC electric motor drivingly connected to the wheel, including
an armature, and
a field coil electrically connected in series with the armature, the field coil having an input and an output,
an additional electrical path; and
one or more current-control elements that control one or more aspects of electrical activity in the additional electrical path, including, when inductance of the field coil generates a higher voltage at the output than at the input in response to a decrease in electric current through the field coil due to slippage of the wheel, allowing the voltage induced by the field coil to drive electric current to flow from the output, through the additional electrical path, to the input without flowing through the armature.

2. The power system of claim 1, wherein the one or more current-control elements include a rectifier.

3. The power system of claim 2, wherein the rectifier is a passive rectifier.

4. The power system of claim 2, wherein the rectifier is an active rectifier.

5. The power system of claim 2, wherein an anode of the rectifier is electrically connected to the output and a cathode of the rectifier is electrically connected to the input of the field coil.

6. The power system of claim 1, wherein the one or more current-control elements include a diode having an anode electrically connected to the output of the field coil and a cathode electrically connected to the input of the field coil.

7. The power system of claim 1, wherein the additional electrical path is part of the DC electric motor.

8. The power system of claim 7, wherein at least one of the one or more current-control elements is part of the DC electric motor.

9. The power system of claim 1, wherein at least one of the one or more current-control elements is part of the DC electric motor.

10. A method of operating a power system, comprising:
electrically connecting a field coil and an armature of a DC electric motor in series to a power source;
driving a wheel with the DC electric motor; and
when inductance of the field coil generates a higher voltage at an output of the field coil than at an input of the field coil in response to a decrease in electric current through the field coil due to slippage of the wheel, using the voltage induced by the field coil to drive electric current to flow from the output, through an additional electrical path, to the input without flowing through the armature.

11. The method of claim 10, wherein the additional electrical flow path includes a rectifier.

12. The method of claim 11, wherein the rectifier is a passive rectifier.

13. The method of claim 11, wherein the rectifier is an active rectifier.

14. The method of claim 11, wherein the rectifier is a diode.

15. A method of operating a mobile machine, comprising:
supplying DC electric current with a power source;
propelling the mobile machine at least in part with a wheel drivingly connected to the DC electric propulsion motor, including
electrically connecting the armature and the field coil to the power source in series, and
in response to inductance of the field coil generating a voltage at an output of the field coil greater than a voltage at an input of the field coil due to slippage of the wheel, allowing the voltage induced by the field coil to drive electric current to flow from the output of the field coil, through a rectifier, to the input of the field coil.

16. The method of claim 15, wherein the rectifier is a passive rectifier.

17. The method of claim 15, wherein the rectifier is a diode.

18. The method of claim 15, wherein the rectifier is an active rectifier.

* * * * *